(12) United States Patent
Clapper et al.

(10) Patent No.: US 10,808,844 B2
(45) Date of Patent: Oct. 20, 2020

(54) SYSTEM, METHOD AND APPARATUS FOR PIPE RESTRAINED JOINT SEAL AND LOCK

(71) Applicant: North American Pipe Corporation, Houston, TX (US)

(72) Inventors: Joshua E. Clapper, Downingtown, PA (US); Dmitry Yashin, Haverford, PA (US); Roy L. Dean, Schwenksville, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 367 days.

(21) Appl. No.: 15/879,204

(22) Filed: Jan. 24, 2018

(65) Prior Publication Data

US 2018/0224041 A1 Aug. 9, 2018

Related U.S. Application Data

(60) Provisional application No. 62/455,467, filed on Feb. 6, 2017.

(51) Int. Cl.
*F16L 37/098* (2006.01)
*F16J 15/06* (2006.01)
*F16L 37/084* (2006.01)

(52) U.S. Cl.
CPC ......... *F16J 15/064* (2013.01); *F16L 37/0845* (2013.01); *F16L 37/0987* (2013.01)

(58) Field of Classification Search
CPC ..... F16L 37/091; F16L 37/096; F16L 37/098; F16L 37/0985; F16L 37/0987
See application file for complete search history.

(56) References Cited

U.S. PATENT DOCUMENTS

| | | | | |
|---|---|---|---|---|
| 3,272,538 A | * | 9/1966 | Bergstrom | F16L 37/0845 285/231 |
| 3,389,923 A | | 6/1968 | Love, Jr. et al. | |
| 3,447,819 A | * | 6/1969 | Borsum | F16L 37/0987 285/111 |
| 3,532,367 A | | 10/1970 | Roos | |
| 3,731,955 A | * | 5/1973 | Borsum | F16L 17/035 285/111 |
| 4,014,556 A | | 3/1977 | Anderson | |
| 4,105,226 A | | 8/1978 | Frey et al. | |

(Continued)

FOREIGN PATENT DOCUMENTS

| | | |
|---|---|---|
| CN | 203442398 U | 2/2014 |
| CN | 204372428 U | 6/2015 |

(Continued)

*Primary Examiner* — David Bochna
(74) *Attorney, Agent, or Firm* — Lempia Summerfield Katz LLC

(57) ABSTRACT

A pipe restrained joint seal and lock can include a ring that is continuous and annular. The ring can have an axis, a proximal end and a distal end axially spaced apart from the proximal end. A spline can extend from the ring to engage a spline groove of a tubular component. The spline can include one or more of the following features: a seal mounted to the distal end of the ring; the seal mounted to the ring axially distal of the spline; the seal mounted to the ring radially outward of the spline relative to the axis; and the seal mounted to the ring, the seal having a seal groove extending in a distal direction, and a portion of the ring is located in the seal groove.

17 Claims, 9 Drawing Sheets

(56) References Cited

U.S. PATENT DOCUMENTS

| | | | |
|---|---|---|---|
| 4,361,349 A | 11/1982 | Wolf et al. | |
| 4,625,383 A * | 12/1986 | Vassallo | B29C 57/025 |
| | | | 264/296 |
| 4,818,209 A * | 4/1989 | Petersson | F16L 37/0845 |
| | | | 425/392 |
| 4,848,805 A * | 7/1989 | Bucher | F16L 37/0845 |
| | | | 285/105 |
| 5,067,751 A * | 11/1991 | Walworth | F16L 37/0845 |
| | | | 285/105 |
| 5,176,413 A * | 1/1993 | Westman | F16L 37/088 |
| | | | 277/626 |
| 5,197,768 A * | 3/1993 | Conner | F16L 37/0842 |
| | | | 285/105 |
| 5,295,697 A * | 3/1994 | Weber | F16L 37/0845 |
| | | | 277/616 |
| 5,297,826 A * | 3/1994 | Percebois | F16L 21/08 |
| | | | 285/232 |
| 5,609,368 A * | 3/1997 | Maki | F16L 21/08 |
| | | | 285/12 |
| 5,662,360 A | 9/1997 | Guzowski | |
| 6,113,158 A * | 9/2000 | Bocchicchio | F16L 25/0018 |
| | | | 285/110 |
| 6,367,802 B1 * | 4/2002 | Knapp | F16L 21/03 |
| | | | 277/314 |
| 6,974,160 B2 * | 12/2005 | Jones | F16L 21/08 |
| | | | 285/104 |
| 7,097,211 B2 | 8/2006 | Adams | |
| 7,284,310 B2 | 10/2007 | Jones et al. | |
| 7,537,248 B2 | 5/2009 | Jones et al. | |
| 7,618,071 B2 | 11/2009 | Jones et al. | |
| 7,845,686 B2 * | 12/2010 | Steinbruck | F16L 37/148 |
| | | | 285/305 |
| 8,096,585 B2 * | 1/2012 | Vitel | F16L 37/0845 |
| | | | 285/110 |
| 8,516,678 B2 | 8/2013 | Hennemann et al. | |
| 8,857,861 B2 * | 10/2014 | German | F16L 37/0845 |
| | | | 285/105 |
| 9,951,869 B2 * | 4/2018 | Lopez-Chaves | F16J 15/022 |
| 10,288,199 B2 * | 5/2019 | Copeland | F16L 37/08 |
| 2005/0167976 A1 * | 8/2005 | Le Quere | F16L 37/0887 |
| | | | 285/39 |
| 2010/0078937 A1 | 4/2010 | Jones et al. | |
| 2014/0203552 A1 | 7/2014 | Guzowski et al. | |
| 2017/0370505 A1 * | 12/2017 | Copeland | F16L 37/0845 |
| 2019/0331274 A1 * | 10/2019 | Quesada | F16L 37/0845 |

FOREIGN PATENT DOCUMENTS

| | | |
|---|---|---|
| EP | 1681506 A2 | 7/2006 |
| GB | 2081406 A | 2/1982 |

* cited by examiner

SYSTEM, METHOD AND APPARATUS FOR PIPE RESTRAINED JOINT SEAL AND LOCK

This applications claims priority to and the benefit of U.S. Prov. Pat. App. No. 62/455,467, filed Feb. 6, 2017, which is incorporated herein by reference in its entirety.

BACKGROUND OF THE INVENTION

Field of the Disclosure

The present invention relates in general to pipes and, in particular, to a system, method and apparatus for a pipe restrained joint seal and lock.

DESCRIPTION OF THE PRIOR ART

Conventional spline-type, restrained pipe joint systems typically have splines and separate, axially spaced-apart seals. The splines and seals can be lost during transportation or disassembly. Examples of such designs include U.S. Pat. Nos. 5,662,360, 7,284,310, and 7,537,248. There are no "push to lock" type pipe joints that rely on a spline to automatically "expand" to open, and then snaps into place and seals the joint. Some users would prefer a quicker installation of restrained joint pipe that does not require "reversibility" (i.e., the ability to take the joint apart after assembly), and yet still provide a robust, sealed pipe joint system. Thus, improvements in pipe restrained joints continue to be of interest.

SUMMARY

Embodiments of a system, method and apparatus for a pipe restrained joint seal and lock are disclosed. For example, embodiments can include a ring that is continuous and annular. The ring can have an axis, a proximal end and a distal end axially spaced apart from the proximal end. A spline can extend from the ring to engage a spline groove of a tubular component. The spline can include one or more of the following features: a seal mounted to the distal end of the ring; the seal mounted to the ring axially distal of the spline; the seal mounted to the ring radially outward of the spline relative to the axis; and the seal mounted to the ring, the seal having a seal groove extending in a distal direction, and a portion of the ring is located in the seal groove.

Embodiments of a tubular component can include a tubular body having an axis, a bore extending along the axis, and a bore groove formed in the bore. A restrained joint seal and lock may be mounted in the bore groove, and include one or more of the previously described features. Similarly, the restrained joint seal and lock may be employed in a pipe system and/or a pipe assembly having belled pipes or straight pipes and couplings.

Other embodiments can include a method of forming a pipe assembly. The method can include providing a tubular component with an axis, a bore extending along the axis, a bore groove formed in the bore, and a restrained joint seal and lock mounted in the bore groove, the restrained joint seal and lock comprising a seal mounted to a ring that is continuous, annular and has a spline; inserting a pipe into the bore of the tubular component such that an outer surface of the pipe engages the spline to deflect the spline radially outward; and then further inserting the pipe into the bore of the tubular component such that the spline moves radially inward into a pipe spline groove in the outer surface of the pipe to lock and seal the tubular component to the pipe.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
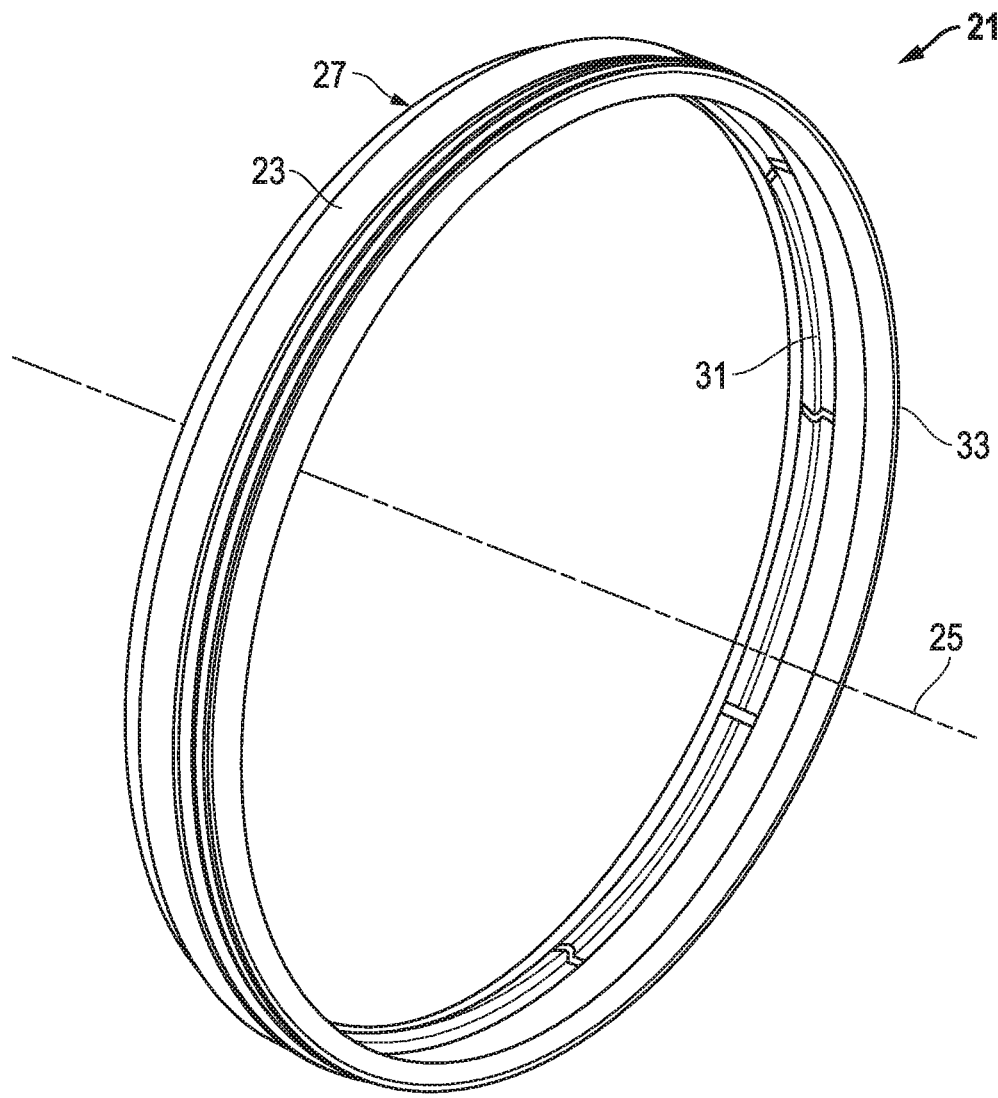
FIG. 1 is an isometric view of an embodiment of a restrained joint seal and lock.
Figure 2:
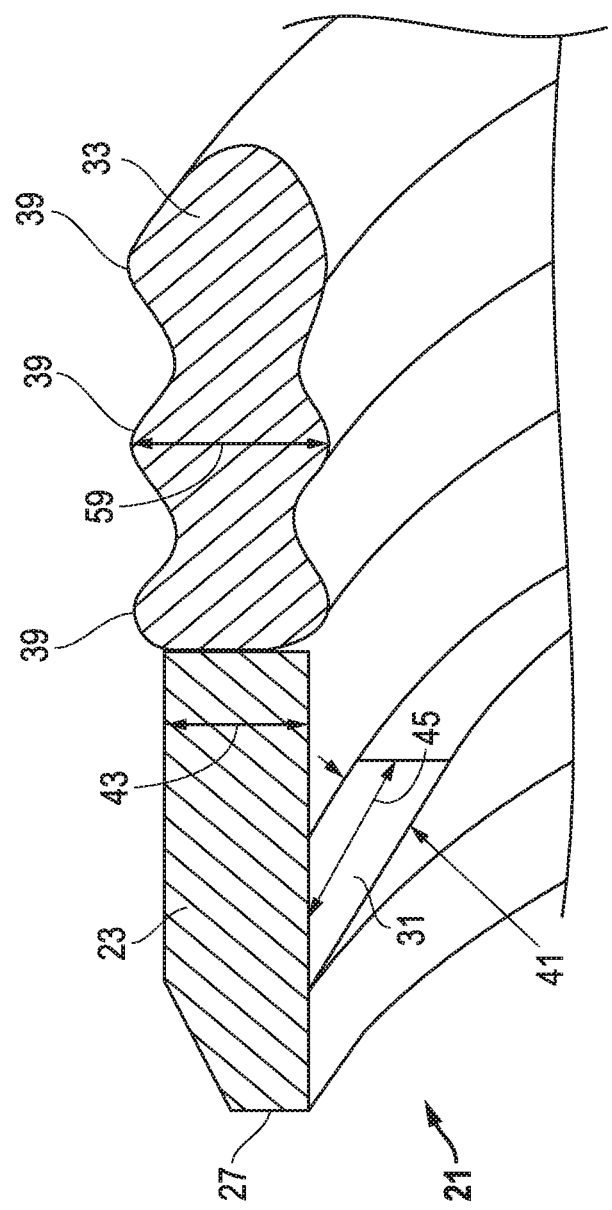
FIG. 2 is an enlarged, radial sectional, isometric view of an embodiment of the restrained joint seal and lock.
Figure 3:
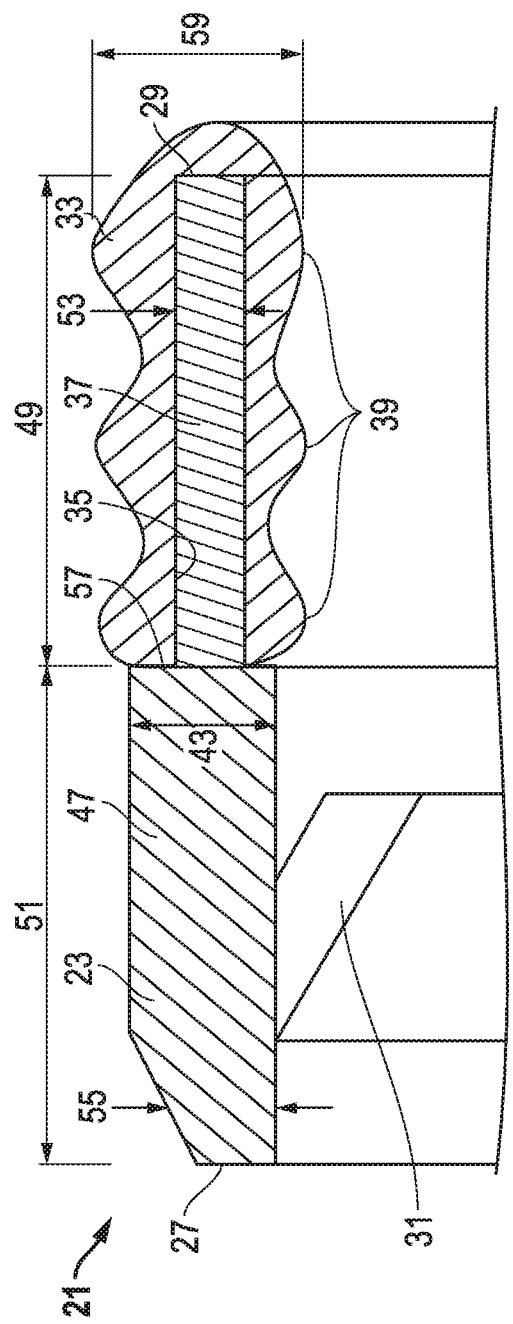
FIG. 3 is an enlarged, radial sectional view of an embodiment of the restrained joint seal and lock.

FIGS. 1-3 depict an embodiment of a restrained joint seal and lock (RJSL) 21. RJSL 21 can include a ring 23 that is continuous and annular. The ring 23 may comprise an axis 25, a proximal end 27 and a distal end 29 (FIG. 3) that is axially spaced apart from the proximal end 27. Ring 23 also can include a spline 31, such as a pipe restrainer, snap ring or connector. Ring 23 may further comprise a seal 33. In one example, the seal 33 is mounted to the distal end 29 of the ring 23. In another version, the seal 33 is mounted to the ring 23 axially distal of the spline 31. Embodiments of the seal 33 may be mounted to the ring 23 radially outward of the spline 31 relative to the axis 25. In addition, the seal 33 can include a seal groove 35 extending in a distal direction. A concealed portion 37 of the ring 23 may be located in the seal groove 35.

Embodiments of the ring 23 may comprise a first material, and the seal 33 may comprise a second material that is softer than the first material. For example, the ring 23 may comprise an injection molded polymer and the seal 33 may comprise an elastomer. In one version, the polymer is polyvinylchloride (PVC).

Versions of the ring 23 are generally planar, and versions of the spline 31 are generally diagonal. Embodiments of the spline 31 may protrude distally and radially inward relative to the axis 25. In an alternate example, the spline 31 protrudes distally and radially outward relative to the axis 25 when the RJSL 21 is configured to be mounted to an exterior of a pipe rather than an interior of a belled pipe or coupling.

In some embodiments, the spline 31 is located axially between the proximal and distal ends 27, 29. The seal 33 can be spaced apart from and free of contact with the spline 31. The seal 33 may extend in an axial direction. The seal 33 may be configured to both axially seal and radially seal. The seal groove 35 may extend in an axial direction, and the distal end 29 of the ring 23 may be located in the seal groove 35. In addition, the seal 33 may be co-molded onto the ring 23.

Embodiments of the seal 33 can include a seal wall thickness that varies relative to the ring 23. Thus, the seal 33 can have a variable sectional shape. For example, the seal 33 may be undulated. The seal can include one or more protrusions 39 on at least one of a radial outer surface and a radial inner surface thereof. In an example, the seal 33 can include a plurality of protrusions 39 on each of a radial outer surface and a radial inner surface thereof.

Embodiments of the spline 31 can include a plurality of splines 31 that are symmetrically spaced apart from each other as shown in FIG. 1. The spline 31 can have a substantially constant wall thickness 41 (FIG. 2), other than at an intersection with the ring 23. In an example, the ring 23 has a ring maximum radial dimension 43 relative to the axis 25. Similarly, the spline 31 can have a spline maximum radial extension 45 from the ring 23, and the ring maximum radial dimension 43 can be substantially similar to the spline maximum radial extension 45 from the ring 23.

As shown in FIG. 3, the ring 23 may comprise the concealed portion 37 located inside the seal 33, an exposed portion 47 located outside the seal 33, and the concealed and exposed portions 27, 47 can have axial dimensions 49, 51, respectively, that are approximately equal. The concealed portion 37 can include a constant wall thickness 53, and the exposed portion 47 may comprise a variable wall thickness 55. In a version, the wall thickness 53 of the concealed portion 37 may be less than that (thickness 55) of the exposed portion 47.

Examples of the seal 33 may abut a first shoulder (e.g., distal end 29) on the concealed portion 37 and a second shoulder 57 on the exposed portion 47. The ring 23 can have a maximum radial dimension 43 relative to the axis 25 that is substantially similar to that (thickness 59) of the seal 33.

Figure 4:
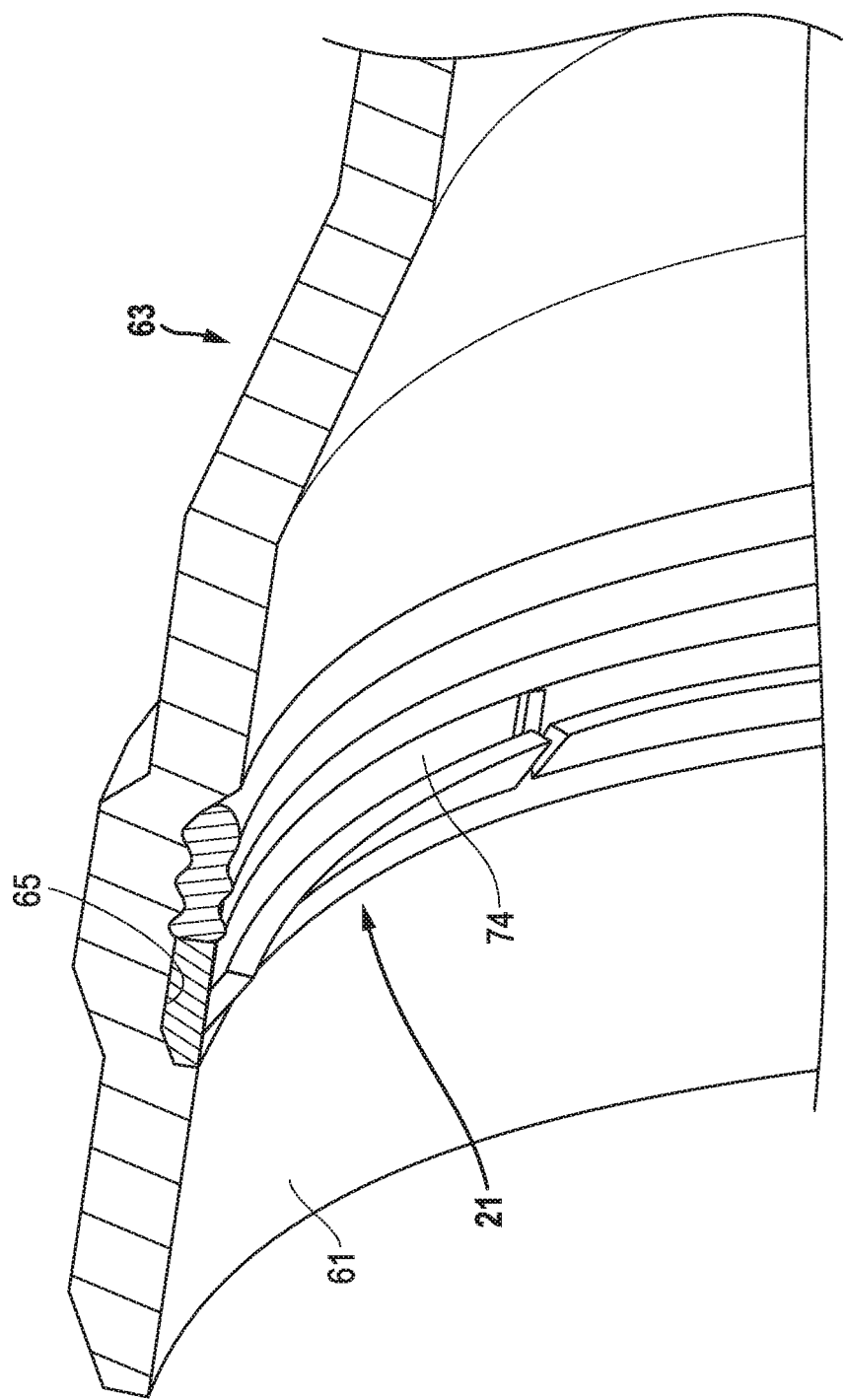
FIG. 4 is radial sectional, isometric view of an embodiment of the restrained joint seal and lock installed in a tubular component.

FIG. 4 depicts the RJSL 21 installed or inserted into an interior or bell 61 of a component 63. This may occur during a belling manufacturing operation performed on the component 63. Alternatively, the RJSL 21 may be installed into a groove 65 of the component 63 after the groove 65 is already formed in the component 63. The component 63 can be a pipe or a coupling.

Figure 5:
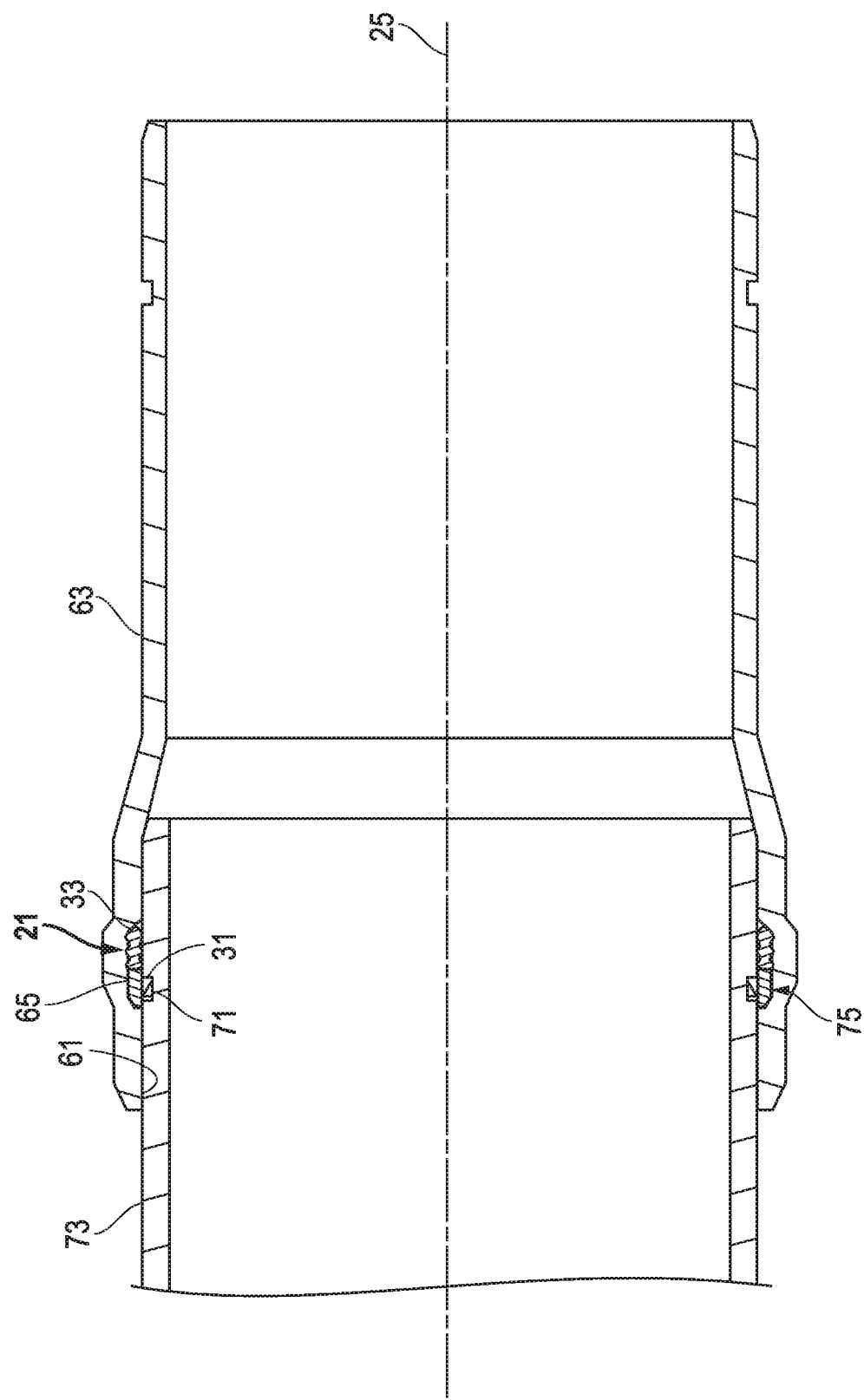
FIG. 5 is radial sectional view of an embodiment of the restrained joint seal and lock installed in a pipe assembly.

FIG. 5 illustrates the spline 31 having a locked position where it is seated in a spline groove 71, such as a receiving groove. During installation, the spline 31 can have a deflected position (see, e.g., spline 131 in FIG. 8 in the deflected position) when it is in contact with an outer surface of the pipe 73 prior to reaching the locked position. In the deflected position the spline 31 is radially flexed toward the ring 23. In the deflected position, the spline 31 may be configured to at least partially enter a recess 74 (FIG. 4) in a radially inner portion of the ring 23.

Embodiments of the spline groove 71 in the pipe 73 may pre-exist, such that the spline 31 does not form the spline groove 71. In an alternate embodiment, the RJSL 21 can be mounted to the exterior of a pipe such that the spline engages a spline groove in the interior of a bell.

Embodiments of the ring 23 may comprise an exposed planar portion 75. The RJSL 21 can seat in groove 65 and, in the locked position, only a portion of the exposed planar portion 75 may contact the groove 65 due to the presence and thickness of the seal 33, which prevents full contact of the exposed planar portion 75 with the groove 65.

Figure 6:
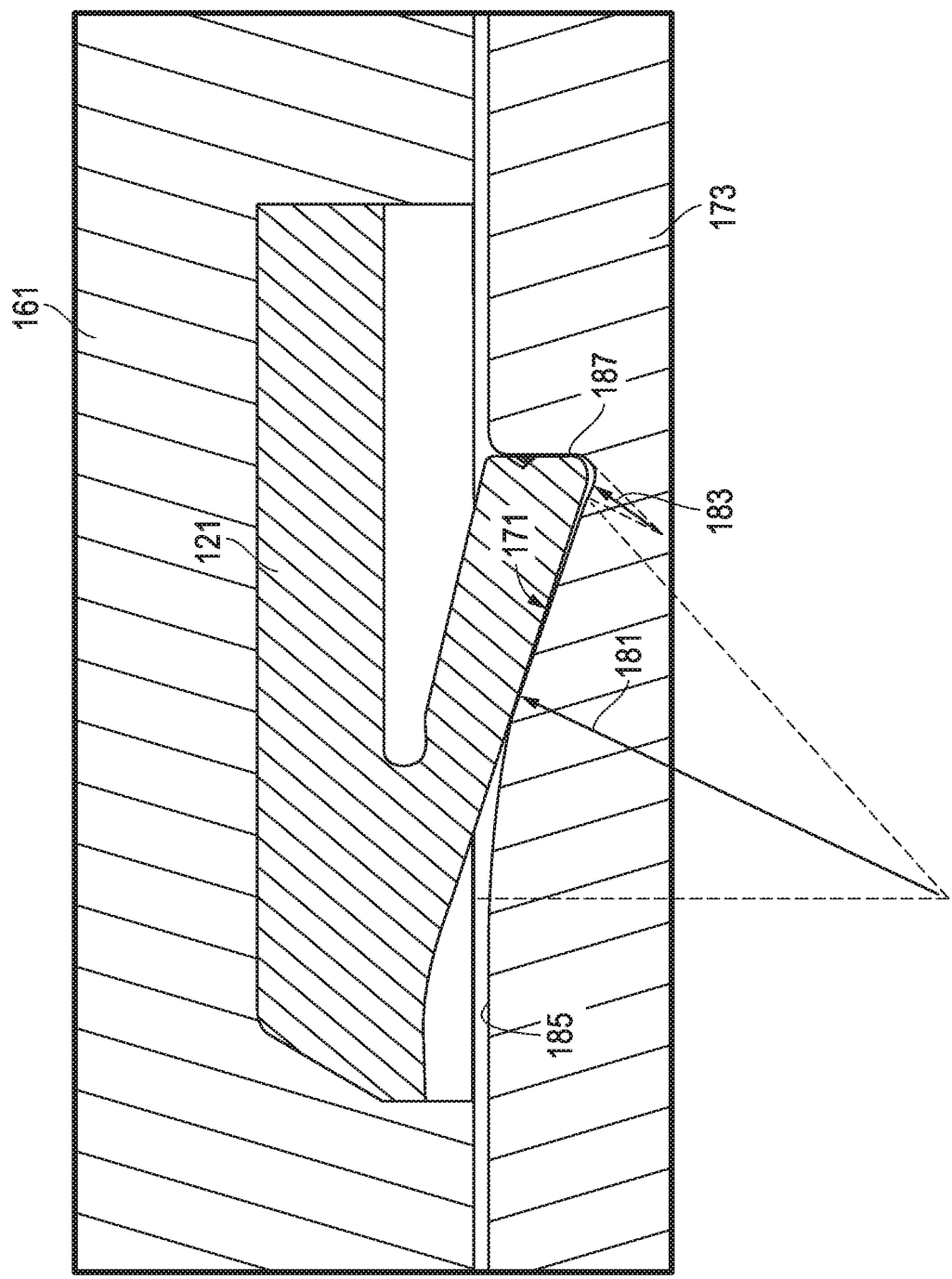
FIG. 6 is an enlarged sectional view of an alternate embodiment of a pipe joint.

FIG. 6 depicts alternate embodiments of the RJSL 121 and the spline groove 171 in a bell 161 and pipe 173, respectively. For example, spline groove 171 in pipe 173 can have a radius of curvature. The spline groove 171 can have a first radius of curvature 181 extending from a surface 185 of the pipe 173, and a second radius of curvature 183 from the first radius of curvature 181 to a radially deepest portion 187 of the spline groove 171. The second radius of curvature 183 can be greater than the first radius of curvature 181.

Figure 7:
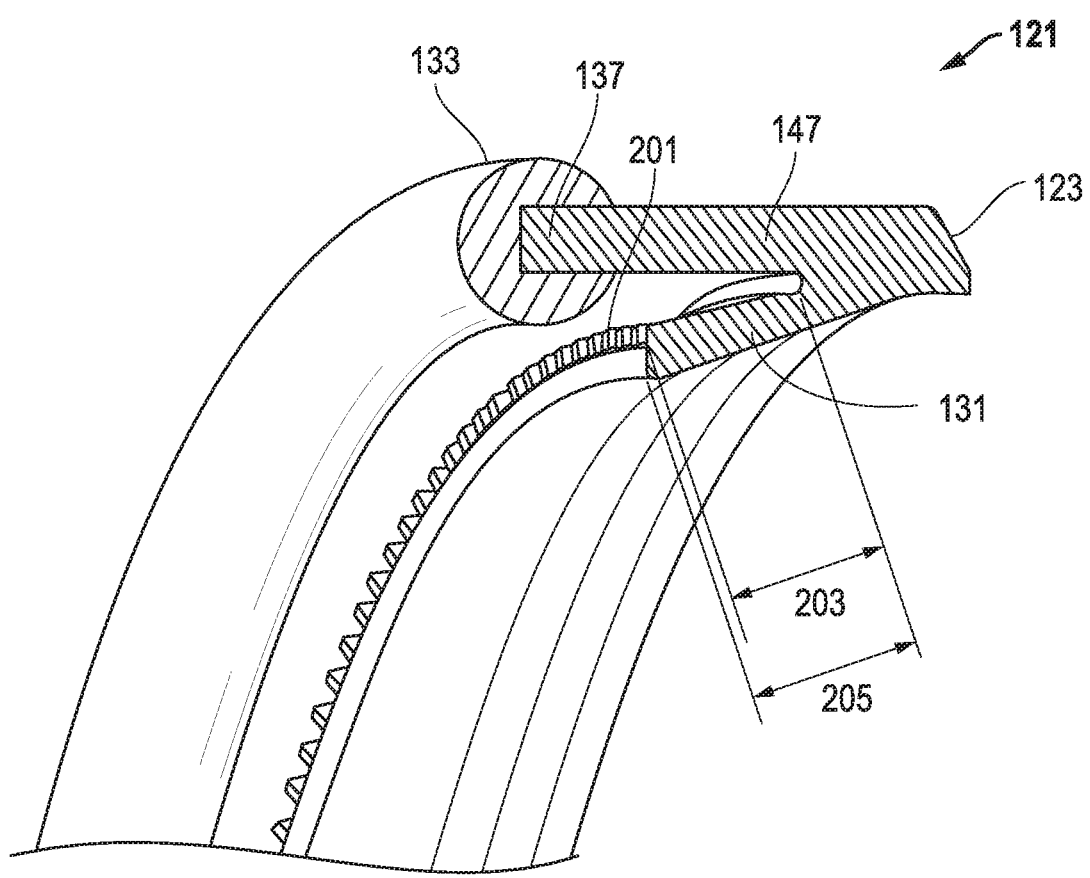
FIG. 7 is an isometric, partially-sectioned view of an alternate embodiment of a restrained joint seal and lock.
Figure 8:
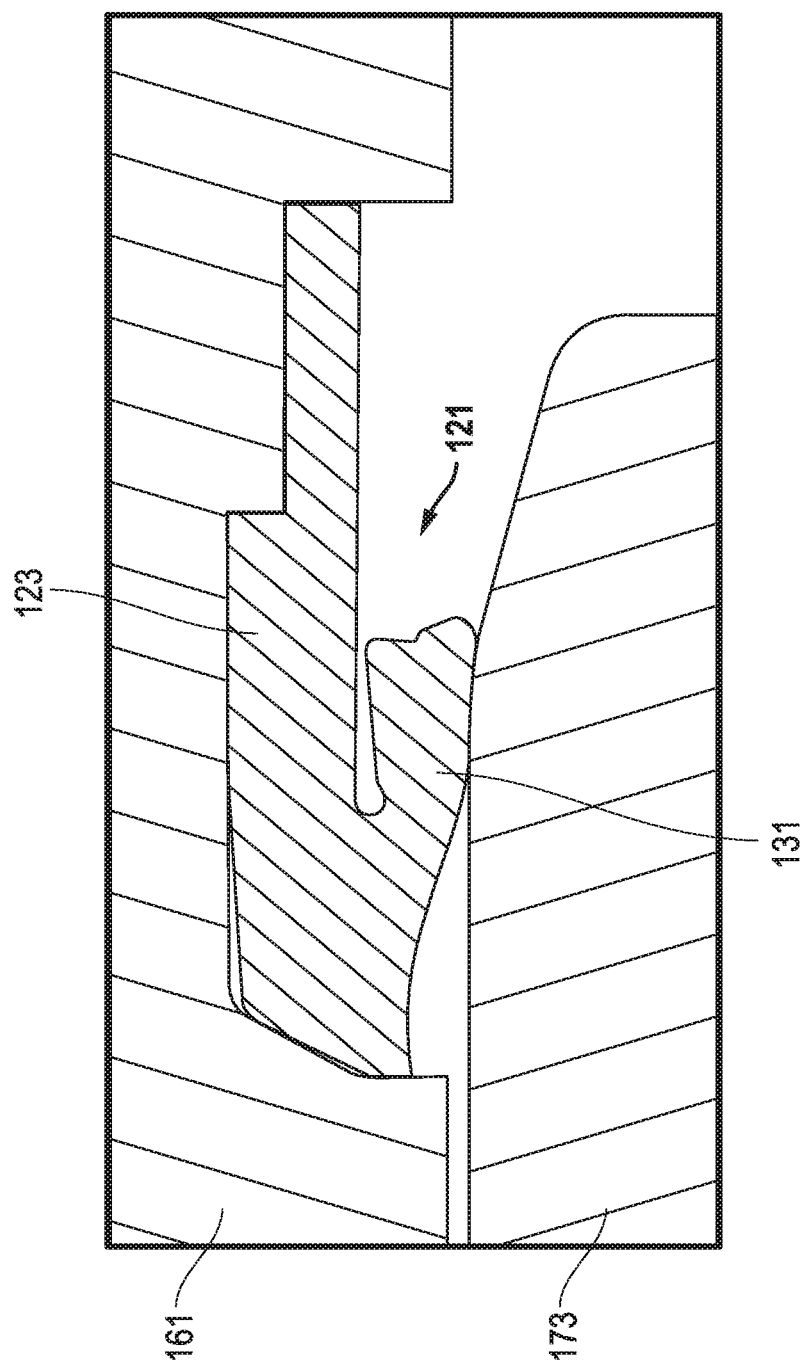
FIGS. 8 and 9 show the restrained joint seal and lock of FIG. 7 partially installed and completely installed, respectively, in a pipe system.
Figure 9:
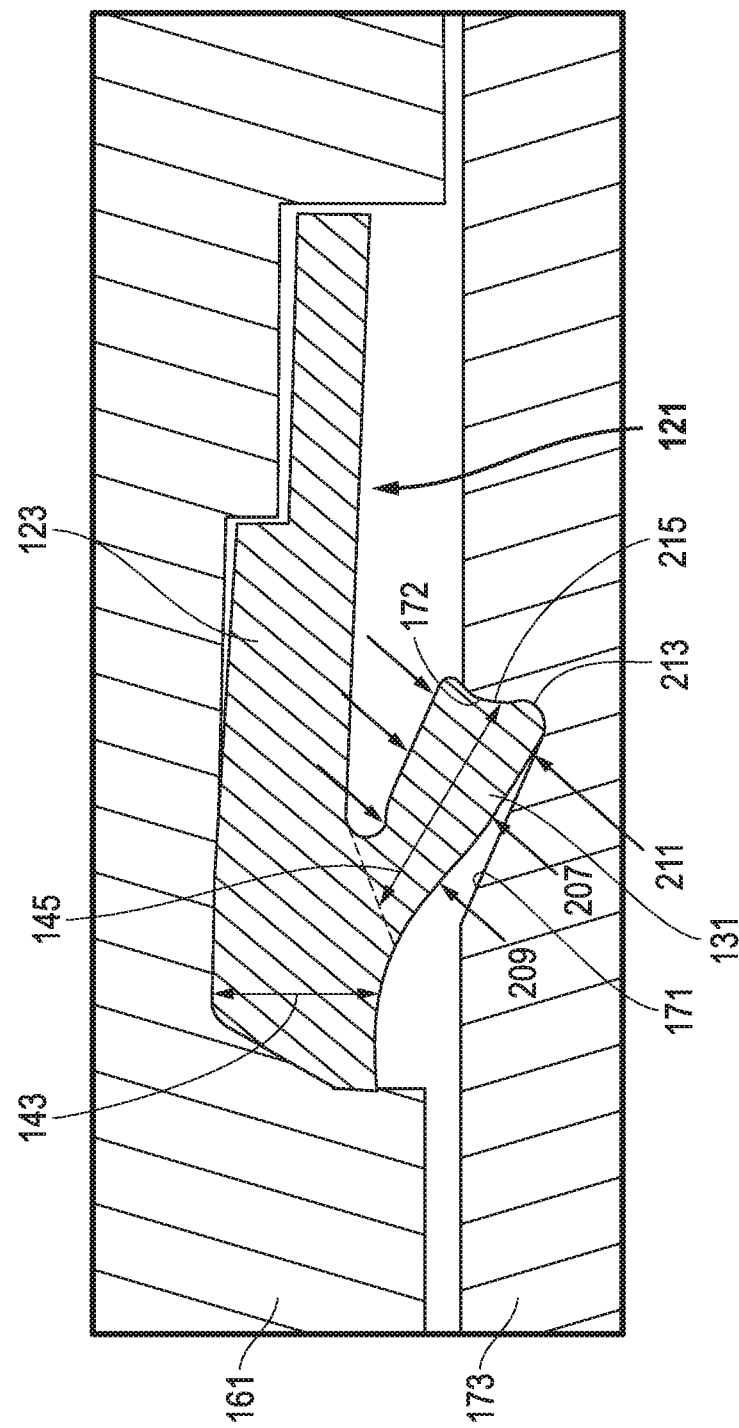

FIGS. 7-9 further illustrate the embodiment of RJSL 121 including ring 123 and seal 133. However, in FIGS. 6, 8 and 9, RJSL 121 is shown without seal 133 merely for ease of illustration, even though a seal is included. Embodiments or RJSL 121 can include a spline 131 that consists of only one continuous, annular spline 131, rather than the segmented spline 31 shown in FIG. 1.

Versions of spline 131 can include ribs 201 for stiffening reinforcement of the spline 131. The ribs 201 may be parallel to each other and configured to reduce buckling of the spline 131 when tension is applied between pipe 173 and the tubular component having bell 161. The ribs 201 may circumscribe a radial outer surface of the spline 131, as shown. The ribs 201 can have an axial length 203 that is shorter than a spline axial length 205 of the spline 131.

Embodiments of the spline 131 can include a variable wall thickness 207 (FIG. 9). The spline 131 can include a minimum wall thickness 209 adjacent the ring 123, and a maximum wall thickness 211 adjacent a trailing edge 213 thereof. In addition, the spline 131 can include the trailing edge 213 with an annular groove 215 configured to enhance engagement with the spline groove 171. The spline groove 171 can include a shoulder 172 that is radiused and configured to assist moving the spline 131 in a desired direction during operation.

As shown in FIG. 7, the ring 123 can have a concealed portion 137 located inside the seal 133, an exposed portion 147 located outside the seal 133, and the concealed portion 137 can be axially shorter than the exposed portion 147. The ring 123 can have a ring maximum radial dimension 143 (FIG. 9) relative to the axis. The spline 131 can have a spline maximum radial extension 145 from the ring 123, and the ring maximum radial dimension 143 can be less than the spline maximum radial extension 145 from the ring 123.

Any of the RJSL embodiments disclosed herein may be included with a tubular component, such as a pipe or coupling. As shown in FIG. 5, the tubular component can have a tubular body with an axis 25, a bore 61 extending along the axis, and a bore groove 65 formed in the bore 61. Similarly, the RJSLs disclosed herein can be part of a pipe system or a pipe assembly as well.

Embodiments of a method of forming a pipe assembly also are disclosed. For example, the method can include providing a tubular component (e.g., pipe 63 in FIG. 5) with an axis 25, a bore 61 extending along the axis 25, and a bore groove 65 formed in the bore 61. RJSL 21 may be mounted in the bore groove 65. The method also can include inserting a pipe 73 into the bore 61 of the tubular component 63 such that an outer surface of the pipe (see, e.g., FIG. 8) engages the spline 31 to deflect the spline 31 radially outward. In addition, the method can include further inserting the pipe 73 into the bore 61 of the tubular component 63 such that the spline 31 moves radially inward into a pipe spline groove 71 (FIG. 5) in the outer surface of the pipe 73 to lock and seal the tubular component 63 to the pipe 73.

Other versions can include one or more of the following embodiments:

Embodiment 1

A restrained joint seal and lock, comprising:
a ring that is continuous and annular, the ring comprising an axis, a proximal end, a distal end axially spaced apart from the proximal end, and a spline configured to engage a spline groove of a tubular component comprising one of a belled pipe and a coupling; and at least one of the following:
a seal mounted to the distal end of the ring;
the seal mounted to the ring axially distal of the spline;
the seal mounted to the ring radially outward of the spline relative to the axis; and
the seal mounted to the ring, the seal having a seal groove extending in a distal direction, and a portion of the ring is configured to be located in the seal groove.

Embodiment 2

The restrained joint seal and lock of any of these embodiments, wherein the ring comprises a first material, and the seal comprises a second material that is softer than the first material.

Embodiment 3

The restrained joint seal and lock of any of these embodiments, wherein the ring comprises an injection molded polymer and the seal comprises an elastomer.

Embodiment 4

The restrained joint seal and lock of any of these embodiments, wherein the ring is generally planar and the spline is generally diagonal.

Embodiment 5

The restrained joint seal and lock of any of these embodiments, wherein the spline protrudes distally and radially inward relative to the axis.

Embodiment 6

The restrained joint seal and lock of any of these embodiments, wherein the spline protrudes distally and radially outward relative to the axis.

Embodiment 7

The restrained joint seal and lock of any of these embodiments, wherein the spline groove is configured to have a radius of curvature.

Embodiment 8

The restrained joint seal and lock of any of these embodiments, wherein the spline groove is configured to have a first radius of curvature extending from a bore of the tubular member, and a second radius of curvature from the first radius of curvature to a radially deepest portion of the spline groove.

Embodiment 9

The restrained joint seal and lock of any of these embodiments, wherein the second radius of curvature is greater than the first radius of curvature.

Embodiment 10

The restrained joint seal and lock of any of these embodiments, wherein the spline is configured to have a locked position wherein it is seated in the spline groove, a deflected position when in contact with a surface of the tubular member prior to reaching the locked position, and in the deflected position the spline is radially flexed toward the ring.

Embodiment 11

The restrained joint seal and lock of any of these embodiments, wherein the ring comprises an exposed planar portion, the restrained joint seal and lock is configured to seat in a recess of a second tubular member and, in the locked position, only a portion of the exposed planar portion contacts the recess due to the presence of the seal which prevents full contact of the exposed planar portion with the recess.

Embodiment 12

The restrained joint seal and lock of any of these embodiments, wherein, in the deflected position, the spline is configured to at least partially enter a recess in a radially inner portion of the ring.

Embodiment 13

The restrained joint seal and lock of any of these embodiments, wherein the spline is located axially between the proximal and distal ends.

Embodiment 14

The restrained joint seal and lock of any of these embodiments, wherein the seal is radially outward of the spline relative to the axis, and the seal is axially inboard of the spline relative to an open end of the tubular component.

Embodiment 15

The restrained joint seal and lock of any of these embodiments, wherein the seal is spaced apart from and free of contact with the spline.

Embodiment 16

The restrained joint seal and lock of any of these embodiments, wherein the seal extends in an axial direction.

Embodiment 17

The restrained joint seal and lock of any of these embodiments, wherein the seal is configured to both axially seal and radially seal.

Embodiment 18

The restrained joint seal and lock of any of these embodiments, wherein the seal has a groove extending in an axial direction, and the distal end of the ring is located in the groove.

Embodiment 19

The restrained joint seal and lock of any of these embodiments, wherein the seal has a groove extending in a distal direction, and the distal end of the ring is located in the groove.

Embodiment 20

The restrained joint seal and lock of any of these embodiments, wherein the seal is co-molded onto the ring.

Embodiment 21

The restrained joint seal and lock of any of these embodiments, wherein the seal has a seal wall thickness that varies relative to the ring.

Embodiment 22

The restrained joint seal and lock of any of these embodiments, wherein the restrained joint seal and lock is configured to be inserted into a bell of a component during a belling manufacturing operation performed on the component.

Embodiment 23

The restrained joint seal and lock of any of these embodiments, wherein the restrained joint seal and lock is configured to be installed into a groove of a component after the groove is formed in the component.

Embodiment 24

The restrained joint seal and lock of any of these embodiments, wherein the tubular component is a pipe, and the spline groove is configured to be in an exterior of the pipe.

Embodiment 25

The restrained joint seal and lock of any of these embodiments, wherein the tubular component is one of a pipe and a coupling.

Embodiment 26

The restrained joint seal and lock of any of these embodiments, wherein the spline groove is configured to be on an interior of said one of the pipe and the coupling.

Embodiment 27

The restrained joint seal and lock of any of these embodiments, wherein the spline groove in the tubular component is configured to pre-exist, such that the spline is not configured to form the spline groove.

Embodiment 28

The restrained joint seal and lock of any of these embodiments, wherein the spline comprises a plurality of splines that are symmetrically spaced apart from each other, and each of the splines is configured to engage a respective spline groove in the tubular component.

Embodiment 29

The restrained joint seal and lock of any of these embodiments, wherein the spline comprises a substantially constant wall thickness, other than at an intersection with the ring.

Embodiment 30

The restrained joint seal and lock of any of these embodiments, wherein the ring has a ring maximum radial dimension relative to the axis, the spline has a spline maximum radial extension from the ring, and the ring maximum radial dimension is substantially similar to the spline maximum radial extension from the ring.

Embodiment 31

The restrained joint seal and lock of any of these embodiments, wherein the seal has a variable sectional shape.

Embodiment 32

The restrained joint seal and lock of any of these embodiments, wherein the seal is undulated.

Embodiment 33

The restrained joint seal and lock of any of these embodiments, wherein the seal comprises a protrusion on at least one of a radial outer surface and a radial inner surface thereof.

Embodiment 34

The restrained joint seal and lock of any of these embodiments, wherein the seal comprises a plurality of protrusions on each of a radial outer surface and a radial inner surface thereof.

Embodiment 35

The restrained joint seal and lock of any of these embodiments, wherein the ring comprises a concealed portion located inside the seal, an exposed portion located outside the seal, and the concealed and exposed portions have axial dimensions that are approximately equal.

Embodiment 36

The restrained joint seal and lock of any of these embodiments, wherein the concealed portion comprises a constant wall thickness, and the exposed portion comprises a variable wall thickness.

Embodiment 37

The restrained joint seal and lock of any of these embodiments, wherein the concealed portion comprises a wall thickness that is less than that of the exposed portion.

Embodiment 38

The restrained joint seal and lock of any of these embodiments, wherein the seal abuts a first shoulder on the concealed portion and a second shoulder on the exposed portion.

Embodiment 39

The restrained joint seal and lock of any of these embodiments, wherein the ring has a maximum radial dimension relative to the axis that is substantially similar to that of the seal.

Embodiment 40

The restrained joint seal and lock of any of these embodiments, wherein the spline consists of only one continuous, annular spline.

Embodiment 41a

The restrained joint seal and lock of any of these embodiments, wherein the spline comprises ribs configured to provide stiffening reinforcement of the spline, and the ribs are configured to reduce buckling of the spline when tension is applied to the tubular component.

Embodiment 41b

The restrained joint seal and lock of any of these embodiments, wherein the ribs are configured to not impact an ability of the spline to flex for installation, add the ribs are configured to add stiffness to the ring under load.

Embodiment 42

The restrained joint seal and lock of any of these embodiments, wherein the ribs circumscribe a radial outer surface of the spline.

Embodiment 43

The restrained joint seal and lock of any of these embodiments, wherein the ribs have an axial length that is shorter than that of the spline.

Embodiment 44

The restrained joint seal and lock of any of these embodiments, wherein the spline comprises a variable wall thickness.

Embodiment 45

The restrained joint seal and lock of any of these embodiments, wherein the spline comprises a minimum wall thickness adjacent the ring, and a maximum wall thickness adjacent a trailing edge thereof.

Embodiment 46

The restrained joint seal and lock of any of these embodiments, wherein the spline comprises a trailing edge having an annular groove configured to enhance engagement with the spline groove.

Embodiment 47

The restrained joint seal and lock of any of these embodiments, wherein the spline groove is configured to comprise a shoulder that is radiused and configured to assist moving the spline in a desired direction during operation.

Embodiment 48

The restrained joint seal and lock of any of these embodiments, wherein the ring comprises a concealed portion located inside the seal, an exposed portion located outside the seal, and the concealed portion is axially shorter than the exposed portion.

Embodiment 49

The restrained joint seal and lock of any of these embodiments, wherein the ring has a ring maximum radial dimension relative to the axis, the spline has a spline maximum radial extension from the ring, and the ring maximum radial dimension is less than the spline maximum radial extension from the ring.

Embodiment 50

A tubular component, comprising:
a tubular body having an axis, a bore extending along the axis, and a bore groove formed in the bore; and
a restrained joint seal and lock mounted in the bore groove, the restrained joint seal and lock comprising:
a ring that is continuous and annular, the ring comprising
a proximal end, a distal end axially spaced apart from the proximal end, and a spline configured to engage a pipe spline groove of a pipe; and at least one of the following:
a seal mounted to the distal end of the ring;
the seal mounted to the ring axially distal of the spline;
the seal mounted to the ring radially outward of the spline relative to the axis; and
the seal mounted to the ring, the seal having a seal groove extending in a distal direction, and a portion of the ring is located in the seal groove.

Embodiment 51

The tubular component of any of these embodiments, wherein the tubular component is one of a belled pipe and a coupling.

Embodiment 52

A pipe system, comprising:
a tubular component having an axis, a bore extending along the axis, and a bore groove formed in the bore;
a pipe configured to be mounted in the bore of the tubular component, the pipe having a pipe spline groove; and
a restrained joint seal and lock mounted in the bore groove configured to seal and lock the tubular component to the pipe, the restrained joint seal and lock comprising:
a ring that is continuous and annular, the ring comprising
a proximal end, a distal end axially spaced apart from the proximal end, and a spline configured to engage the pipe spline groove of the pipe; and at least one of the following:
a seal mounted to the distal end of the ring;
the seal mounted to the ring axially distal of the spline;
the seal mounted to the ring radially outward of the spline relative to the axis; and the seal mounted to the ring, the seal having a seal groove extending in a distal direction, and a portion of the ring is located in the seal groove.

Embodiment 53

The pipe system of any of these embodiments, wherein the tubular component is one of a belled pipe and a coupling.

Embodiment 54

A pipe assembly, comprising:
a tubular component having an axis, a bore extending along the axis, and a bore groove formed in the bore;
a pipe mounted in the bore of the tubular component, the pipe having a pipe spline groove; and
a restrained joint seal and lock mounted in the bore groove to seal and lock the tubular component to the pipe, the restrained joint seal and lock comprising:
a ring that is continuous and annular, the ring comprising a proximal end, a distal end axially spaced apart from the proximal end, and a spline configured to engage the pipe spline groove of the pipe; and at least one of the following:
 a seal mounted to the distal end of the ring;
 the seal mounted to the ring axially distal of the spline;
 the seal mounted to the ring radially outward of the spline relative to the axis; and
 the seal mounted to the ring, the seal having a seal groove extending in a distal direction, and a portion of the ring is located in the seal groove.

Embodiment 55

The pipe assembly of any of these embodiments, wherein the tubular component is one of a belled pipe and a coupling.

Embodiment 56

A method of forming a pipe assembly, comprising:
(a) providing a tubular component with an axis, a bore extending along the axis, a bore groove formed in the bore, and a restrained joint seal and lock mounted in the bore groove, the restrained joint seal and lock comprising a seal mounted to a ring that is continuous, annular and has a spline;
(b) inserting a pipe into the bore of the tubular component such that an outer surface of the pipe engages the spline to deflect the spline radially outward; and then
(c) further inserting the pipe into the bore of the tubular component such that the spline moves radially inward into a pipe spline groove in the outer surface of the pipe to lock and seal the tubular component to the pipe.

Embodiment 57

The restrained joint seal and lock of any of these embodiments, wherein the spline comprise spline segments, each of which is configured to flex independently of the other spline segments.

Embodiment 58

The restrained joint seal and lock of any of these embodiments, wherein the ribs are configured to not impact an ability of the spline to flex for installation, add the ribs add stiffness to the ring under load.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A restrained joint seal and lock, comprising:
    a ring that is continuous and annular, the ring including an axis, a proximal end, a distal end axially spaced apart from the proximal end, and a spline configured to engage a spline groove of a tubular component, wherein the tubular component is one of a belled pipe or a coupling;
    a seal; and
    at least one of the following,
        the seal being mounted to the distal end of the ring,
        the seal being mounted to the ring axially distal of the spline,
        the seal being mounted to the ring radially outward of the spline relative to the axis, or
        the seal being mounted to the ring, the seal having a seal groove extending in a distal direction, and a portion of the ring is configured to be located in the seal groove,
    wherein the seal includes a plurality of protrusions on each of a radial outer surface and a radial inner surface thereof.

2. The restrained joint seal and lock of claim 1, wherein the ring comprises a polymer and the seal comprises an elastomer.

3. The restrained joint seal and lock of claim 1, wherein the spline groove is configured to have a radius of curvature.

4. The restrained joint seal and lock of claim 1, wherein the spline groove is configured to have a first radius of curvature extending from a bore of the tubular component, and a second radius of curvature from the first radius of curvature to a radially deepest portion of the spline groove.

5. The restrained joint seal and lock of claim 1, wherein the spline is configured to have a locked position wherein it is seated in the spline groove, a deflected position when in contact with a surface of the tubular component prior to reaching the locked position, and in the deflected position the spline is radially flexed toward the ring; and
    in the deflected position, the spline is configured to at least partially enter a recess in a radially inner portion of the ring.

6. The restrained joint seal and lock of claim 1, wherein the seal is radially outward of the spline relative to the axis, and the seal is axially inboard of the spline relative to an open end of the tubular component.

7. The restrained joint seal and lock of claim 1, wherein the seal is co-molded onto the ring.

8. The restrained joint seal and lock of claim 1, wherein the restrained joint seal and lock is configured to be inserted into a bell of a component during a belling manufacturing operation performed on the component.

9. The restrained joint seal and lock of claim 1, wherein the restrained joint seal and lock is configured to be installed into a groove of a component after the groove is formed in the component.

10. The restrained joint seal and lock of claim 1, wherein the spline comprises a plurality of splines that are symmetrically spaced apart from each other, each of which is configured to engage a respective spline groove in the tubular component.

11. The restrained joint seal and lock of claim 1, wherein the seal has a variable sectional shape.

12. The restrained joint seal and lock of claim 1, wherein the ring comprises a concealed portion located inside the seal and an exposed portion located outside the seal.

13. The restrained joint seal and lock of claim 1, wherein the spline consists of only one continuous, annular spline.

14. The restrained joint seal and lock of claim 1, wherein the spline comprises multiple spline segments, each spline segment of which is configured to flex independently of other of the multiple spline segments.

15. The restrained joint seal and lock of claim 1, wherein the spline groove is configured to comprise a shoulder that is radiused and configured to assist moving the spline in a desired direction during operation.

16. A restrained joint seal and lock, comprising:
    a ring that is continuous and annular, the ring including an axis, a proximal end, a distal end axially spaced apart from the proximal end, and a spline configured to engage a spline groove of a tubular component, wherein the tubular component is one of a belled pipe or a coupling;
    a seal; and
    at least one of the following,
        the seal being mounted to the distal end of the ring,
        the seal being mounted to the ring axially distal of the spline,
        the seal being mounted to the ring radially outward of the spline relative to the axis, or
        the seal being mounted to the ring, the seal having a seal groove extending in a distal direction, and a portion of the ring is configured to be located in the seal groove,
    wherein the spline includes ribs, the ribs configured to: provide stiffening reinforcement of the spline; reduce buckling of the spline when tension is applied to the tubular component; not impact an ability of the spline to flex for installation; and add stiffness to the ring under load.

17. A restrained joint seal and lock, comprising:
    a ring that is continuous and annular, the ring including an axis, a proximal end, a distal end axially spaced apart from the proximal end, and a spline configured to engage a spline groove of a tubular component, wherein the tubular component is one of a belled pipe or a coupling;
    a seal; and
    at least one of the following,
        the seal being mounted to the distal end of the ring,
        the seal being mounted to the ring axially distal of the spline,
        the seal being mounted to the ring radially outward of the spline relative to the axis, or
        the seal being mounted to the ring, the seal having a seal groove extending in a distal direction, and a portion of the ring is configured to be located in the seal groove, wherein the spline includes a trailing edge having an annular groove configured to enhance engagement with the spline groove.

* * * * *